(12) United States Patent
Richter et al.

(10) Patent No.: US 8,415,005 B2
(45) Date of Patent: Apr. 9, 2013

(54) NON-STICK COATING

(75) Inventors: Dirk Richter, Wohnsitz (DE); Christian Pluta, Wohnsitz (DE)

(73) Assignee: Dirk Richter, Düren (DE)

( * ) Notice: Subject to any disclaimer, the term of this patent is extended or adjusted under 35 U.S.C. 154(b) by 0 days.

(21) Appl. No.: 12/312,263

(22) PCT Filed: Nov. 5, 2007

(86) PCT No.: PCT/DE2007/001989
§ 371 (c)(1),
(2), (4) Date: Aug. 18, 2009

(87) PCT Pub. No.: WO2008/052540
PCT Pub. Date: May 8, 2008

(65) Prior Publication Data
US 2010/0068491 A1    Mar. 18, 2010

(30) Foreign Application Priority Data
Nov. 3, 2006    (DE) .......................... 10 2006 052 249

(51) Int. Cl.
*B32B 27/02*    (2006.01)
*B32B 5/16*    (2006.01)
*C09D 175/00*    (2006.01)
*C09D 163/00*    (2006.01)
*C09D 109/00*    (2006.01)
*C08L 63/00*    (2006.01)

(52) U.S. Cl.
USPC ........... 428/220; 428/323; 523/400; 524/261; 524/404; 524/437; 524/572; 524/590

(58) Field of Classification Search ........................ None
See application file for complete search history.

(56) References Cited

U.S. PATENT DOCUMENTS

| | | | |
|---|---|---|---|
| 5,171,622 A | | 12/1992 | Wegner |
| 5,558,906 A | * | 9/1996 | Albrinck et al. .............. 427/180 |
| 2006/0147675 A1 | | 7/2006 | Nun et al. |

FOREIGN PATENT DOCUMENTS

| | | |
|---|---|---|
| DE | 39 39 704 | 6/1991 |
| DE | 195 14 432 | 10/1996 |
| EP | 0 562 191 | 9/1993 |
| EP | 0 737 567 | 10/1996 |
| EP | 737567 A1 * | 10/1996 |
| EP | 1 674 535 | 6/2006 |
| EP | 1 752 227 | 2/2007 |
| SU | 1 564 171 | 5/1990 |
| WO | WO 81/01149 | 4/1981 |
| WO | WO 90/15109 | 12/1990 |
| WO | WO 03/052014 | 6/2003 |
| WO | WO 2006024067 A1 * | 3/2006 |
| WO | WO 2008/043350 | 4/2008 |

OTHER PUBLICATIONS

International Search Report.

* cited by examiner

*Primary Examiner* — David Sample
*Assistant Examiner* — Tahseen N Khan
(74) *Attorney, Agent, or Firm* — Collard & Roe, P.C.

(57) ABSTRACT

In order to provide a non-stick coating which permits a very high coat thickness even under load, a polymeric matrix with embedded non-stick particles is used.

23 Claims, No Drawings

NON-STICK COATING

CROSS REFERENCE TO RELATED APPLICATIONS

This application is the National Stage of PCT/DE2007/001989 filed on Nov. 5, 2007, which claims priority under 35 U.S.C. §119 of German Application No. 10 2006 052 249.4 filed on Nov. 3, 2006. The international application under PCT article 21(2) was not published in English.

The invention relates to a non-stick coating, such as for example are known for plain bearings, floor coverings or even copier rollers and the like.

In this connection, solid additives as non-stick particles, such as for example PTFE, hexagonal boron nitride, graphite or the like may be embedded in a thermoplastic polymer which, in turn, is supported by a substrate, for example made of sintered bronze.

It is the object of the present invention to provide a non-stick coating which permits a very high coat thickness even under load.

A non-stick coating is proposed as a solution, which is characterised in that non-stick particles are embedded in a thermosetting polymeric matrix.

In a polymeric matrix configured in such a manner, in contrast to the prior art, the polymeric matrix has a relatively high degree of stability, so that a supplementary substrate which is in itself load-bearing, such as for example a bronze sintered substrate or the like, may be dispensed with.

In the present connection, the term "thermosetting polymeric matrix" denotes a polymeric matrix which may be liquified and/or removed again merely by decomposition. In particular, plastomers and/or thermoplastics may be differentiated therefrom. In this connection, the polymeric matrix may, for example, comprise polyurethane, polyurea and/or epoxide and/or cross-linked technical rubbers.

Preferably, the polymeric matrix is a cross-linked polymeric matrix, functional non-stick groups being located in the network thereof.

It has surprisingly been shown that such functional non-stick groups not only strengthen the non-stick properties of the corresponding polymeric matrix, but as a result of such functional non-stick groups of the polymeric matrix the embedded non-stick particles remain better bonded in the polymeric matrix.

Accordingly, in this manner and irrespective of the remaining features of the present invention, the life of such a non-stick coating may be substantially increased with a non-stick coating as a result of a cross-linked polymeric matrix with embedded non-stick particles, the functional non-stick groups being located in the network thereof. As a result, on the one hand, the wear resistance increases and, on the other hand, with a suitable configuration the thickness of the non-stick coating may also be increased.

Fluoridated functional groups, functional groups containing silicon and/or functional hydrocarbon groups may be provided, for example, as functional non-stick groups, in the present case all atomic groups in the polymeric matrix which definitively determine the material properties and the reaction behaviour being denoted by the term "functional group". Accordingly, functional non-stick groups denote functional groups which provide the polymeric matrix, comprising said functional non-stick groups, in the region of the functional groups with fewer adhesive properties than the remaining regions of the polymeric matrix.

As already indicated above, in a suitable configuration, the functional non-stick groups may interact with embedded non-stick particles. Insofar as it is a chemical bond, the non-stick particles per se become functional non-stick groups of the polymeric matrix of the non-stick coating. Such an observation, however, only refers to the atomic dimensions of the non-stick particles, so that it is then no longer possible to refer to embedded non-stick particles. This observation is on a mesoscopic scale, in which regions consisting of non-stick material whose size is greater than the average free chain length of the polymeric matrix, are no longer referred to. However, from such an order of magnitude of the non-stick regions, it is possible to refer to embedded non-stick particles even when said non-stick particles are bonded chemically to the polymeric matrix by means of chemical bonds via suitable functional groups of the polymeric matrix.

On the other hand, a chemical bond between the embedded non-stick particles and functional groups of the polymeric matrix is not necessarily required. Instead, due to the functional groups which also may include functional non-stick groups, in a suitable configuration it is sufficient if an environment is created in which the non-stick particles remain there, rather than in the other regions of the polymeric matrix. This may, for example, take place by Van-der-Vaals forces and/or adhesive forces between the respective functional groups and the embedded non-stick particles. Similarly, other interactions with the embedded non-stick particles are conceivable, which preferably have already also been effective during the cross-linking phase, so that already during the cross-linking suitable spaces for the non-stick particles are created which, due to the interaction between the non-stick particles and the polymeric matrix required by the functional interactive groups, lie closer together and thus particularly suitable spaces are provided for retaining the non-stick particles during the curing of the polymeric matrix.

In this respect, also irrespective of the above solutions of the present invention, a non-stick coating is advantageous which is characterised by a cross-linked polymeric matrix with embedded non-stick particles, functional interactive groups for the interaction with embedded non-stick particles being located in the network thereof.

In this connection, each interaction between the interactive groups and the non-stick particles, which leads to a greater attachment of the non-stick particles in the region of the interactive groups than in the remaining regions of the polymeric matrix, is sufficient according to the invention, it being irrelevant whether this interaction occurs exclusively during the cross-linking phase or exclusively after the cross-linking and/or independently thereof.

As already indicated above, the polymeric matrix may comprise polyurethane and/or epoxy resins. In this connection, the non-stick particles may be added before and/or during a cross-linking process. It is also advantageous if the above disclosed functional non-stick groups and/or functional interactive groups are already incorporated in the molecular chains and/or macro molecules provided for the cross-linking. These functional groups may also be provided in the resin or in the hardening agent for epoxy resins. Accordingly, it is advantageous if these functional groups have already been previously applied to components from which the polymeric matrix is made, it also being conceivable in principle to apply these functional groups only during or after cross-linking, which however is generally far more complicated. As the functional non-stick groups and/or the functional interactive groups frequently make cross-linking difficult and/or the stability of the polymeric matrix is reduced, it may be advantageous to provide both conventional cross-linking raw materials and also cross-linking raw materials with functional non-stick groups and/or functional interactive groups. Thus it is conceivable, for example, in the case of epoxy resins to mix a blend made up of conventional resins and resins with non-stick groups with a corresponding hardening agent.

Preferably, in the non-stick coating more than 2.5% by volume, in particular more than 5% by volume and/or more than 10% by volume of embedded non-stick particles are provided relative to the entire coating mass. In particular, by the use of thermosetting plastic resin as the synthetic matrix and/or by the use of the functional non-stick groups or functional interactive groups, such a high volume percentage of non-stick particles may be used in a polymeric matrix without impairing the stability of the non-stick coating.

Also by such a configuration, as already explained above, exceptionally highly stable coat thicknesses may be produced, so that the present invention is suitable in particular for non-stick coatings with a coat thickness or more than 0.8 mm, preferably more than 1.0 mm or even more than 1.2 mm. Accordingly, such non-stick coatings according to the invention, in particular, are also suitable for relatively large objects, such as for example rollers in paper manufacturing or other large rollers with surfaces to be coated of more than 1 m$^2$. It is immediately apparent that when coating rollers which are 4 m or more long and have a diameter of over 30 cm, manufacturing techniques and material qualities from precision engineering, such as may be found for example with printing or copier rollers, may not be used. The exceptional stability of the non-stick coating according to the invention allows the use thereof in mechanical engineering, in particular also in heavy mechanical engineering and plant engineering.

Preferably, the non-stick coating is configured substantially homogenously over at least 50% of its coat thickness, in particular over at least 70% or even over at least 80% of its coat thickness. In this connection, the term "homogeneous" denotes that the volume percentage of the components perpendicular to the surface of the non-stick coating in this region varies by less than 20%, preferably less than 10%. As a result of such a configuration, this non-stick coating differs from the non-stick coatings of the prior art which are incorporated in a bearing material, so that exceptionally non-homogeneous sliding layers are formed in which the proportion of bearing material, such as for example sintered bronze, continually increases with the depth of material, whilst the proportion of sliding material is accordingly continually reduced with the increasing depth of material. In this manner, the present non-stick coating substantially retains its material properties, even with greater wear. Similarly, regrinding is possible without any problems as, with such coat thicknesses, removal of material only has a very slight effect on the material properties. Even in this case, it is overwhelmingly obvious that such non-stick coatings are suitable, in particular for the extreme demands of high coat thicknesses, as well as situations of high wear and extremely large non-stick surfaces.

The embedded non-stick particles, which may be configured as solid additives, may comprise PTFE, $MoS_2$, hexagonal boron nitride, graphite and/or grease and/or other solid sliding means. Synthetic or natural waxes may also be provided. Liquid and/or liquifiable sliding means and/or additives with non-stick properties are also conceivable, the individual liquid particles being held by the polymeric matrix, so that a solid overall arrangement is produced. Also solid and/or liquid materials with a siloxane structure, such as in particular silicone, may accordingly be used. In this connection, the non-stick particles may be micronised i.e. present in the order of magnitude of micrometers or nanoscaled i.e. present in the order of magnitude of nanometers or less.

In a preferred embodiment, hard particles may be embedded in the non-stick coating. In this manner, wear may be minimised without the non-stick properties being impaired too greatly. In particular, at least 10% by volume, preferably at least 15 and/or at least 20 or 30% by volume of the hard particles may be hard balls. Such hard balls may, for example, be obtained by sintering, a spraying method and/or by melting-in hard grains. By using hard balls, the non-stick coating is relatively well-behaved and a material coming into contact therewith is substantially less stressed than if hard particles were used. Moreover, it has been proved that hard balls may be anchored in a polymeric matrix in a substantially more stable manner.

Accordingly, at least 10% by volume, preferably at least 15% by volume and/or at least 20% by volume or 30% by volume of the hard particles may have an index of roundness>0.05 preferably >0.1, in particular >0.15. Cumulatively and/or alternatively at least 10% by volume, in particular at least 15% by volume and/or at least 20% by volume or even at least 30% by volume of the hard particles may have a surface roughness<15%, preferably <12%, in particular <10%, of the average particle diameter. As a measurement of the surface roughness an average roughness $R_a$ and/or average roughness depth (10 point height) $R_z$ may be applied, expressed in spherical coordinates or circular coordinates.

Preferably, the thickness of the non-stick coating is at least four times as great as the average grain diameter of the hard particles. As already explained above, such coat thicknesses are advantageous, in particular in mechanical engineering, and allow repeated resurfacing by grinding as well as a uniformity of the nature of the surface, even in the case of wear.

The hard particles may, in particular, comprise hard metal particles, ceramic particles and/or steel particles.

Preferably, the hard particles have a Mohs hardness of more than 4, preferably more than 5. Hard particles of such hardness result, in particular, in exceptional stability of the polymeric matrix, in particular without substantially impairing the non-stick properties. Also, in such an embodiment the polymeric matrix may be configured to be relatively hard, without the advantages of a substantially greater resilience of the polymeric matrix relative to the hard particles being lost.

On the other hand, more flexible hard particles may also be used, in particular when the polymeric matrix is selected to be more flexible per se. Thus it may be advantageous if the polymeric matrix has a Shore D hardness of less than 80. In such a configuration, the hard particles should therefore have a Shore D hardness which is greater than the Shore D hardness of the polymeric matrix, so that this sufficiently stabilises the non-stick coating.

In this connection, it is noteworthy in particular that generally particles and/or surfaces may only be suitable for either a Mohs hardness measurement or a Shore hardness measurement. With particles which are comparatively very hard, a Shore hardness measurement no longer provides meaningful results. If the particles are not very hard, it is no longer possible to make a differentiation by a Mohs measurement so that then Shore hardness measurements have to be undertaken.

Further advantages, objects and features of the present invention are explained with reference to the following description of three coatings.

Three coatings, which illustrate the effect, have been produced, the following raw materials, having been used:
1. Epoxy resin: Bisphenol A/F with an equivalent weight of 180; specific gravity 1.2 g/ccm
2. Epoxy resin with non-stick groups: equivalent weight 500; specific gravity 1.1 g/ccm 3. Hardening agent: isophorondiamine with equivalent weight of 75; specific gravity 0.9 g/ccm
4. Hard material: quartz; specific gravity 2.2 g/ccm
5. Spherical hard material: aluminum oxide; specific gravity 3.9 g/ccm
6. Non-stick particles: PE-wax; specific gravity 0.9 g/ccm

|  | Coating 1 | Coating 2 | Coating 3 |
|---|---|---|---|
| EP | 100 | 90 | 90 |
| EP with non-stick groups | 0 | 10 | 10 |
| Hardening agent | 42 | 39 | 39 |
| Quartz | 50 | 50 | 50 |
| Aluminium oxide balls | 10 | 10 | 10 |
| PE-wax | 0 | 0 | 15 |

The coatings were surface-cleaned with acetone 48 hours after mixing and subsequently tested. The mechanical properties have been analysed by means of a Taber test. The non-stick effect by means of an adhesive tape test. All results have to be considered relative to coating 1. The assessment was: 1=best, 5=worst.

|  | Coating 1 | Coating 2 | Coating 3 |
|---|---|---|---|
| Taber Test | 1 | 1 | 1 |
| Non-stick effect | 5 | 4 | 1 |

The invention claimed is:

1. Large rollers with a non-stick coating, said non-stick coating comprising a cross-linked polymeric matrix with embedded non-stick particles and embedded hard particles, wherein the thickness of the coating is at least four times as great as the average grain diameter of said hard particles; functional non-stick groups being located in the network of the cross-linked polymeric matrix; wherein said non-stick coating is configured substantially homogeneously over at least 50% of its coat thickness, wherein at least 10% by volume of the hard particles are hard balls, and/or wherein at least 10% by volume of the hard particles have an index of roundness of more than 0.05.

2. Large rollers according to claim 1, wherein the functional non-stick groups comprise fluoridated functional groups, functional groups containing Si, in particular silicone-like functional groups and/or functional hydrocarbon groups.

3. Large rollers according to claim 1, wherein the functional non-stick groups interact with embedded non-stick particles.

4. Large rollers according to claim 1, wherein the a polymeric matrix comprises polyurethane.

5. Large rollers according to claim 1, wherein the polymeric matrix comprises epoxy resins.

6. Large rollers according to claim 1, wherein the a polymeric matrix comprises polyurea.

7. Large rollers according to claim 1, wherein the a polymeric matrix comprises cross-linked rubbers.

8. Large rollers according to claim 1, wherein the non-stick particles comprise PTFE, $MoS_2$, hexagonal boron nitride, $Na_3AlF_6$, grease, synthetic and/or natural waxes, solid and/or liquid materials with a siloxane structure and/or liquid additives with non-stick properties.

9. Large rollers according to claim 1, wherein the hard balls have been obtained by sintering, a spraying method and/or by melting-on hard grains.

10. Large rollers according to claim 1, wherein at least 10% by volume of the hard particles have a surface roughness of less than 15%, preferably less than 12%, in particular less than 10%, of the average particle diameter.

11. Large rollers according to claim 1, wherein the proportion of hard balls relative to the hard particles, is at least 15% by volume, preferably at least 20% by volume, in particular at least 30% by volume.

12. Large rollers according to claim 1, wherein the hard particles comprise hard metal particles, ceramic particles and/or steel particles.

13. Large rollers according to claim 1, wherein the hard particles have a Mohs hardness of more than 4, preferably more than 5.

14. Large rollers according to claim 1, wherein the polymeric matrix has a Shore D hardness of less than 80 and the hard particles a Shore D hardness which is greater than the Shore D hardness of the polymeric matrix.

15. Large rollers according to claim 1, wherein the more than 2.5% by volume of embedded non-stick particles are present.

16. Large rollers according to claim 15, wherein the more than 5% by volume of embedded non-stick particles are present.

17. Large rollers according to claim 16, wherein the more than 10% by volume of embedded non-stick particles are present.

18. Large rollers according to claim 1, further comprising a coat thickness of more than 0.8 mm.

19. Large rollers according to claim 18, further comprising a coat thickness of more than 1 mm.

20. Large rollers according to claim 19, further comprising a coat thickness of more than 1.2 mm.

21. Large rollers according to claim 1, wherein the non-stick coating is configured substantially homogeneously over at least 70% of its coat thickness.

22. Large rollers according to claim 21, wherein the non-stick coating is configured substantially homogeneously over at least 80% of its coat thickness.

23. Large rollers with a non-stick coating, said non-stick coating comprising a cross-linked polymeric matrix with embedded non-stick particles and embedded hard particles, wherein the thickness of the coating is at least four times as great as the average grain diameter of said hard particles; functional interactive groups for interacting with embedded non-stick particles being located in the network of the cross-linked polymeric matrix; wherein said non-stick coating is configured substantially homogeneously over at least 50% of its coat thickness, wherein at least 10% by volume of the hard particles are hard balls, and/or wherein at least 10% by volume of the hard particles have an index roundness of more than 0.05.

* * * * *

UNITED STATES PATENT AND TRADEMARK OFFICE
CERTIFICATE OF CORRECTION

PATENT NO. : 8,415,005 B2  
APPLICATION NO. : 12/312263  
DATED : April 9, 2013  
INVENTOR(S) : Richter et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 418 days.

Signed and Sealed this
Second Day of July, 2013

Teresa Stanek Rea
*Acting Director of the United States Patent and Trademark Office*

UNITED STATES PATENT AND TRADEMARK OFFICE
CERTIFICATE OF CORRECTION

PATENT NO.        : 8,415,005 B2
APPLICATION NO. : 12/312263
DATED             : April 9, 2013
INVENTOR(S)       : Richter et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 864 days.

Signed and Sealed this
First Day of September, 2015

Michelle K. Lee
*Director of the United States Patent and Trademark Office*